US006987479B1

(12) United States Patent
Hansen et al.

(10) Patent No.: US 6,987,479 B1
(45) Date of Patent: Jan. 17, 2006

(54) CONFORMAL RANGE MIGRATION ALGORITHM (CRMA) "KARMA"

(75) Inventors: Charles T. Hansen, Palos Verdes Estates, CA (US); Michael E. Lawrence, San Pedro, CA (US)

(73) Assignee: Raytheon Company, Waltham, MA (US)

( * ) Notice: Subject to any disclaimer, the term of this patent is extended or adjusted under 35 U.S.C. 154(b) by 73 days.

(21) Appl. No.: 10/919,733

(22) Filed: Aug. 17, 2004

Related U.S. Application Data

(63) Continuation-in-part of application No. 10/967,959, filed on Oct. 19, 2004, and a continuation-in-part of application No. 10/911,438, filed on Aug. 4, 2004.

(51) Int. Cl.
G01S 13/90 (2006.01)

(52) U.S. Cl. ............... 342/25 F; 342/25 R; 342/25 A; 342/175; 342/176; 342/179; 342/190; 342/191; 342/195; 342/196

(58) Field of Classification Search .... 342/25 R–25 F, 342/22, 175, 192–197, 176, 179, 190, 191
See application file for complete search history.

(56) References Cited

U.S. PATENT DOCUMENTS

| | | | | |
|---|---|---|---|---|
| 4,706,088 A | * | 11/1987 | Weindling | 342/25 R |
| 4,706,089 A | * | 11/1987 | Weindling | 342/25 R |
| 4,724,418 A | * | 2/1988 | Weindling | 342/25 R |
| 4,771,287 A | * | 9/1988 | Mims | 342/25 R |
| 4,924,229 A | * | 5/1990 | Eichel et al. | 342/25 R |
| 4,999,635 A | * | 3/1991 | Niho | 342/25 R |
| 5,021,789 A | * | 6/1991 | Shaw | 342/25 R |
| 5,043,734 A | * | 8/1991 | Niho | 342/25 R |
| 5,184,134 A | * | 2/1993 | Niho et al. | 342/25 R |
| 5,200,754 A | * | 4/1993 | Niho | 342/25 R |
| 5,248,976 A | * | 9/1993 | Niho et al. | 342/25 R |
| 5,343,204 A | * | 8/1994 | Farmer et al. | 342/25 R |

(Continued)

Primary Examiner—Bernarr E. Gregory
(74) Attorney, Agent, or Firm—Leonard A. Alkov; Karl A. Vick

(57) ABSTRACT

Motion compensation for coherent combination of pulses facilitates a SAR image of a scene on earth's surface. A great circle (406) is centered with respect to the earth's center, The great circle (406) has an axis (412) perpendicular to a first plane. Axis (412) passes through the earth's center. The first plane contains great circle (406) and includes the earth's center. Great circle (406) has a first center defined by an intersection of the first plane and axis (412). The scene has one or more radar scatterers and is located on a surface (402). The radar system is mounted on a moving platform (400) moving with a component of motion in a direction along great circle (406). The radar comprises a radar receiver for digitizing the radar returns having a phase from scatterers on surface (402), and a computer for focusing the phase of said radar returns from the scatterers on surface (402). The surface (402) is located on a local scene centerline circle (408), the local scene centerline circle (408) defining a second plane. This second plane is parallel to the first plane. The local scene centerline circle (408) is centered on the axis at a second center, where the second center is displaced with respect to the first center along the axis by a distance (414). The phase of the radar returns received from the scene is compensated for the motion of the moving platform (400) using a cylindrical coordinate system referenced with respect to the second center to yield a SAR image.

6 Claims, 5 Drawing Sheets

U.S. PATENT DOCUMENTS 5,673,050 A * 9/1997 Moussally et al. ............. 342/22
5,854,602 A * 12/1998 Stankwitz et al. ......... 342/25 R
6,037,892 A * 3/2000 Nikias et al. ............. 342/25 R
6,046,695 A * 4/2000 Poehler et al. ............ 342/25 R
6,088,295 A * 7/2000 Altes ........................ 342/25 A
6,181,270 B1 * 1/2001 Dwyer .................... 342/25 R
6,661,369 B1 * 12/2003 Cho ........................ 342/25 R
6,781,541 B1 * 8/2004 Cho ........................... 342/195

* cited by examiner

CONFORMAL RANGE MIGRATION ALGORITHM (CRMA) "KARMA"

This application is a continuation in part of U.S. patent and Trademark Office application Ser. No. 10/967,959, filed Oct. 19, 2004, titled *Mensuration for the Conformal Range Migration Algorithm* (PD 03W139), and application Ser. No. 10/911,438, filed Aug. 4, 2004, titled *Motion Compensation for Convolutional SAR Algorithms* (PD 03W137).

BACKGROUND OF THE INVENTION

1. Field of the Invention

This invention is in the field of motion compensation of radar returns for use with Synthetic Aperture Radar imaging.

2. Description of the Related Art

Synthetic Aperture Radar (SAR) radar is used for ground mapping as well as target identification. The general principle behind SAR is to coherently combine the amplitude and phase information of radar returns from a plurality of sequentially transmitted pulses from a relatively small antenna on a moving platform.

The plurality of returns creating a SAR image generated by the transmitted pulses along a known path of the platform make up a frame length. During the frame length, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the frame length.

The plurality of pulses transmitted during an SAR frame length, when coherently combined and processed, result in image quality comparable to a longer antenna, corresponding approximately to the "length" traveled by the antenna during the frame length.

The clarity of a SAR image is in many respects is dependent on the quality of the motion compensation applied to each radar return prior to SAR image computation. The SAR process depends on the coherent, phase accurate summing of radar returns. Slight deviations in the accuracy of the motion compensation of incoming pulses introduces distortions over the whole SAR image, reducing its utility.

The Range Migration Algorithm (RMA), a popular way to focus the radar returns forming a SAR image, is derived assuming straight line motion over a flat earth. Inaccuracies arise because the earth is not flat, being in fact ellipsoidal. Some of these inaccuracies are corrected in an ad hoc fashion, but become less accurate as the range and squint angle become larger.

SUMMARY OF THE INVENTION

Motion compensation for coherent combination of pulses is improved by a method for acquiring a synthetic aperture image of a scene on earth's surface. A great circle is centered with respect to the earth's center. The great circle has an axis perpendicular to a first plane. The axis passes through the earth's center. The first plane contains the great circle and includes the earth's center. The great circle has a first center defined by an intersection of the first plane and the axis. The scene has one or more radar scatterers and is located on a surface. The radar system is mounted on a moving platform moving with a component of motion in a direction along the great circle. The radar comprises a radar receiver for digitizing the radar returns having a phase from scatterers on the surface, and a computer for focusing the phase of said radar returns from the scatterers on the surface. The surface is located on a local scene centerline circle, the local scene centerline circle defining a second plane. This second plane is parallel to the first plane. The local scene centerline circle is centered on the axis at a second center, where the second center is displaced with respect to the first center along the axis by a distance. The phase of the radar returns received from the scene is compensated for the motion of the moving platform along the great circle using a cylindrical coordinate system referenced with respect to the second center to yield a clearer SAR image.

DETAILED DESCRIPTION OF THE INVENTION

The present invention describes a method for motion compensating pulses for clearer SAR images using concepts related to the Range Migration Algorithm (RMA). The structure of the RMA is based on a convolution. Generally, it consists of a two dimensional Fourier transform, then a multiply operation, a change of variables to get to rectilinear coordinates, and finally an inverse Fourier transform.

Figure 1:
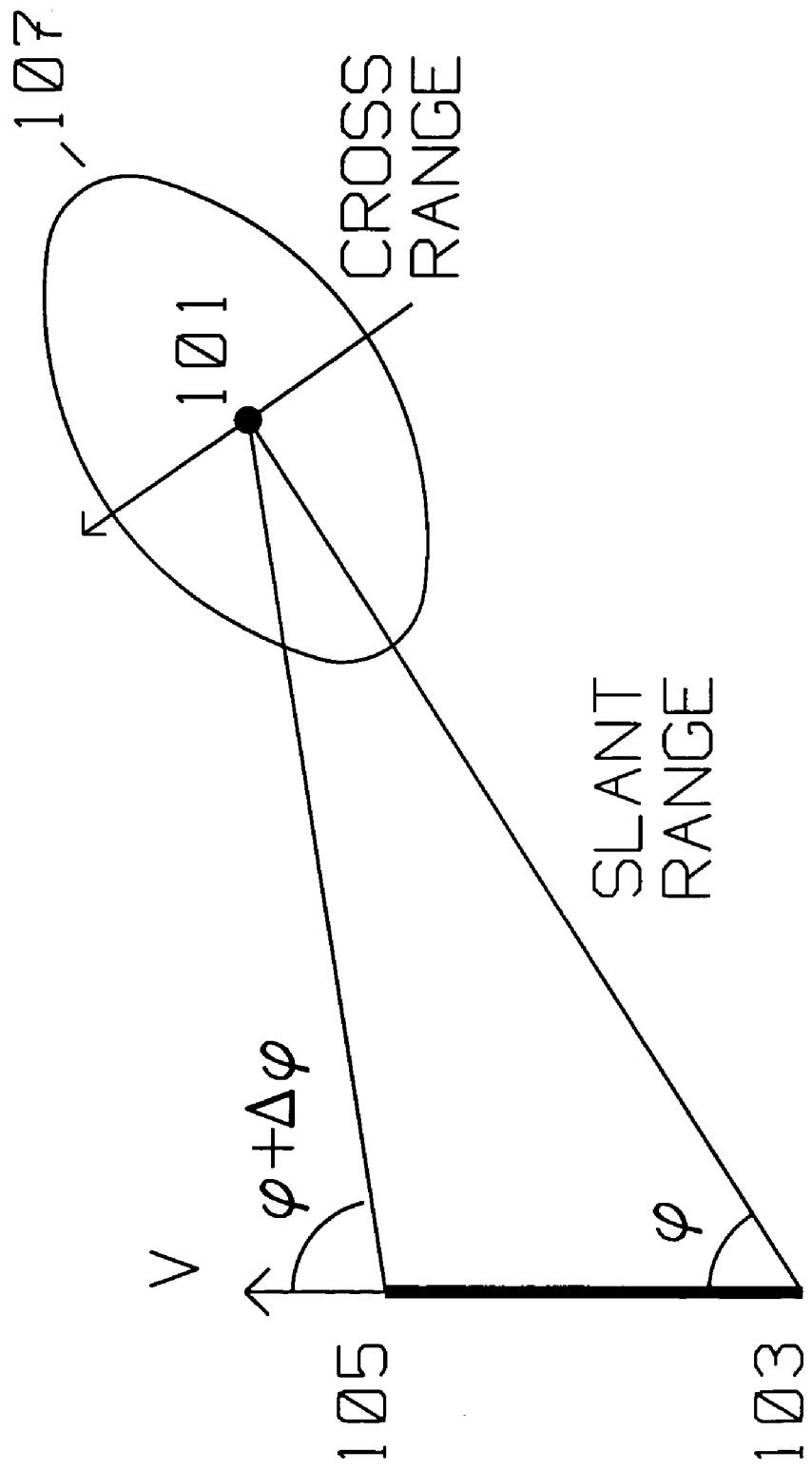
FIG. 1 is a SAR spotlight configuration of the prior art.

FIG. 1 shows the typical prior art geometric relationship between a moving platform carrying a radar transmitter/receiver using Synthetic Aperture (SAR) spotlight methods and target area 101 to be imaged by said radar transmitter/receiver. The moving platform is initially at position 103, travels with velocity V in the direction shown to position 105. In SAR spotlight mode, the SAR antenna is actively oriented towards scatterer 101 as the platform moves with respect to scatterer 101 with velocity V. The moving platform moves from position 103 to position 105, while adjusting the side looking angle from ø to ø+Δø for spotlight mode so that the antenna keeps illuminating target area 101. Antenna illumination with radar energy covers area 107 during the frame length, and includes target area 101. Similarly, the antenna receive pattern covers area 107, and includes target area 101. Radar pulses are transmitted and corresponding returns received at many points during the frame length between position 103 and position 105. SAR radar is well known in the art and, for example, is described by W. Carrara, et al, in *Spotlight Synthetic Aperture Radar*, Artech house, 1995, incorporated herein be reference in its entirety.

For this invention, motion compensation is the process of digital correction of radar phase error for each radar return in a SAR frame forming a SAR image due to the change in position of scatterers along the curved surface of the earth. Motion compensation is performed in the airborne processor on each radar return. The exact form of motion compensation depends on the method used to compile the SAR image from the radar returns. This invention is compatible with the Range Migration Algorithm (RMA), a convolutional algorithm. RMA is preferred because it is better suited to many advanced image analysis techniques such as coherent change detection. The CRMA method of this invention re-casts the convolution which forms the image from a straight line track of the moving platform to a circular track. This allows the pulses gathered during a frame length to conform to the curvature of the earth. A specialized expansion is used to construct the along track matched filter. The method separates typically coupled variables for a more efficient computation.

Figure 2:
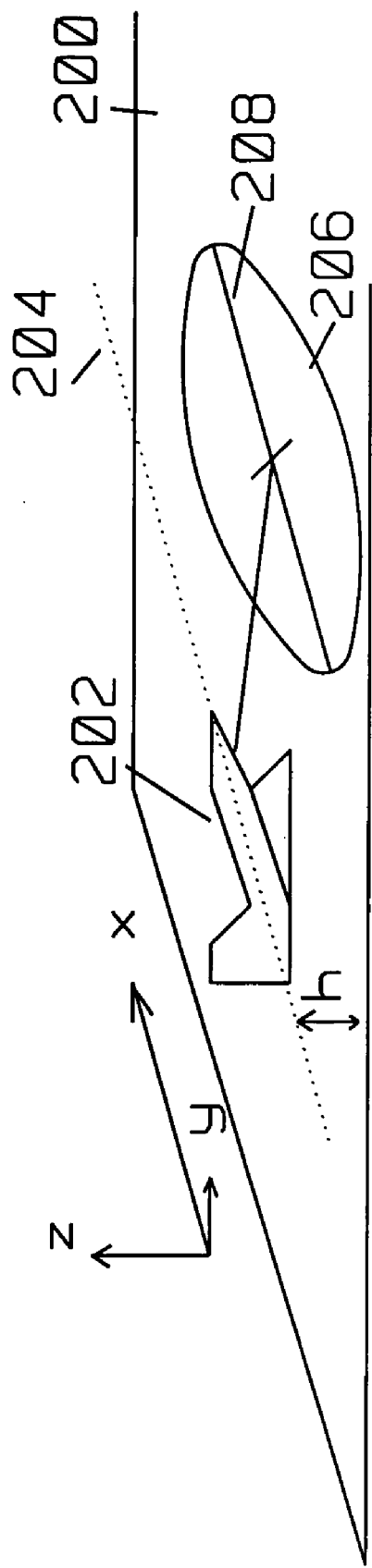
FIG. 2 shows a path of a moving platform (flying aircraft) defining an ideal, straight and level path along the centerline of a scene to be acquired for a SAR image, a baseline case for the acquisition of said SAR image of a scene in spotlight mode.

One assumption in RMA is that the nominal flight path of the moving platform (flying aircraft) during the SAR frame is in a straight line parallel to the centerline of the scene being acquired, where the scene is flat. This condition is not necessarily true at long ranges, resulting in unfocused SAR images. Aircraft ideal track is a straight line, the scene is flat, in a plane parallel to the flight track, as shown in FIG. 2. Aircraft 202 is following flight path 204 in the x direction, at an altitude h above flat area 200 and acquiring SAR image of scene 206. Scene 206 has a centerline 208, where centerline 208 is parallel to flight path 204. In FIG. 2, x direction is the direction of flight.

y direction is perpendicular to x, parallel to the plane of the scene being imaged.

z direction is normal to the plane of the scene, defined by $\hat{z}=\hat{x}\times\hat{y}$ With these definitions, the nominal flight track of the moving platform (aircraft) is $$X_{ac,o}(s) = s\hat{x} + Y_{ac,o}\hat{y} + z_{ac,o}\hat{z}$$

where $Y_{ac,o}$ and $z_{ac,o}$ are constants as it is assumed that the moving platform flies generally straight and level with minor deviations during the duration of the SAR frame resulting in a SAR image of scene 206. The deviations from the straight and level are due to buffeting, pilot inputs, atmospheric conditions or the like.

I. The RMA method—Baseline example.

Figure 3:
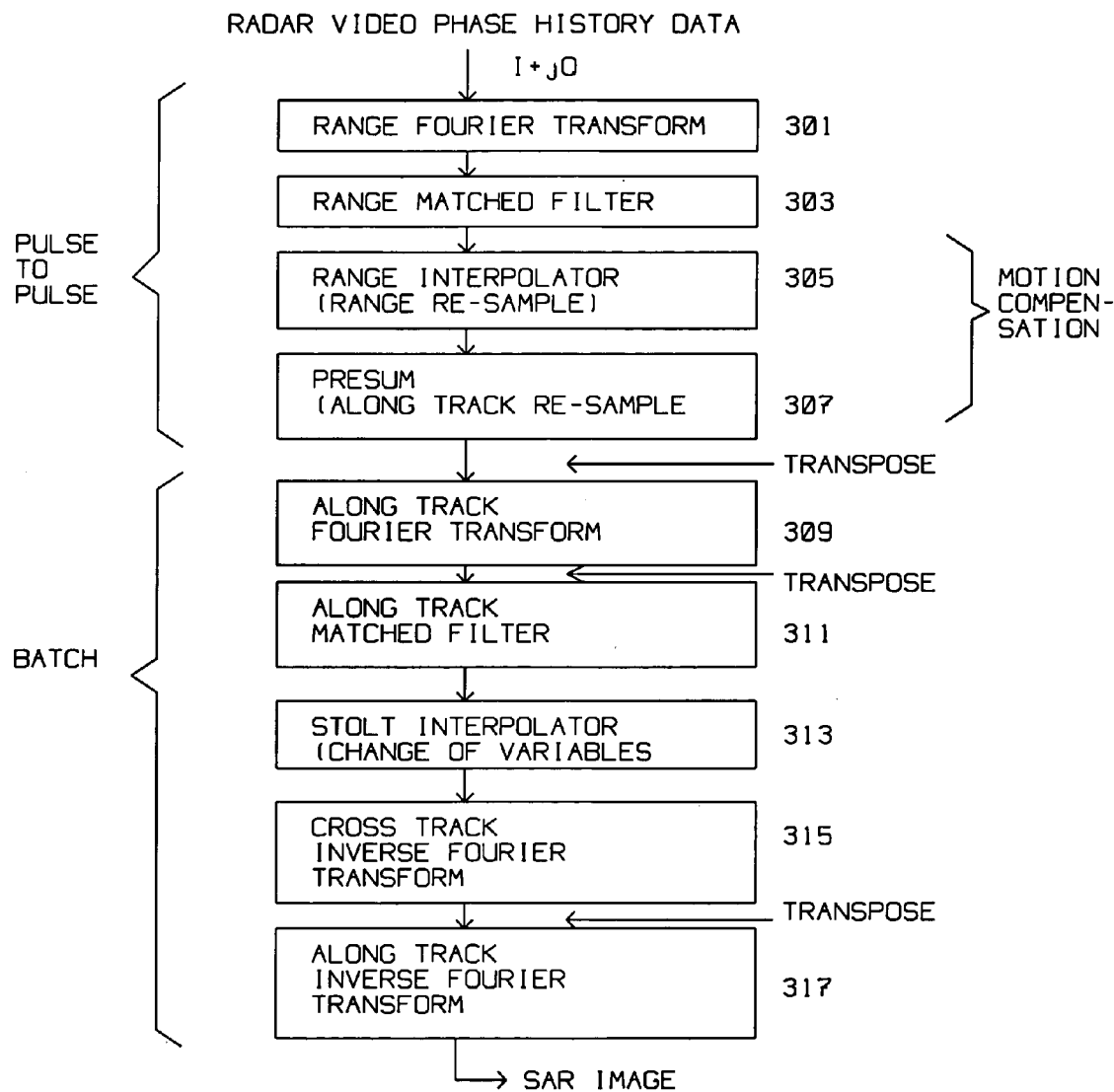
FIG. 3 shows a typical SAR processing sequence for generating a SAR image from radar returns.

FIG. 3 shows briefly, in summary fashion, the steps of a typical RMA method used in acquiring radar data for generating a SAR image. Radar video phase history data, typically digitized samples of I+jQ, are stored on a per pulse basis, and a range Fourier transform 301 operates on these I+jQ samples. The results are further processed by range matched filter 303. Range interpolator 305 (range re-sample) fills in range samples where required. A pre-sum 307 further changes the along track sample rate for optimum operation for each particular pulse return.

A plurality of data for all pulses within a frame are stored, then transposed. An along track Fourier transform 309 is now performed on the data, transposed and presented to along track matched filter 311. The output from filter 311 is processed by a Stolt interpolator 313 for a change in variables, then a cross track inverse Fourier transform 315 is computed. The results are transposed again, and performing an along track, inverse Fourier transform generates the SAR image.

The conventional RMA along track matched filter 311 for the RMA method of FIG. 3 can be represented as:

$$F_{MF} = R_{sc}\sqrt{K_R^2 - K_x^2} - K_R R_s$$

Where $R_s^2{}_c = R_c^2{}_t + Alt^2$, $R_{ct}$ is the perpendicular ground range to the scene center line, Alt is the altitude, and $R_s$ is the nominal range to the scene center line. It an improvement to the along match filter 311 that this invention is directed towards.

II. The Conformal Range Migration Algorithm (CRMA) Method

Figure 4:
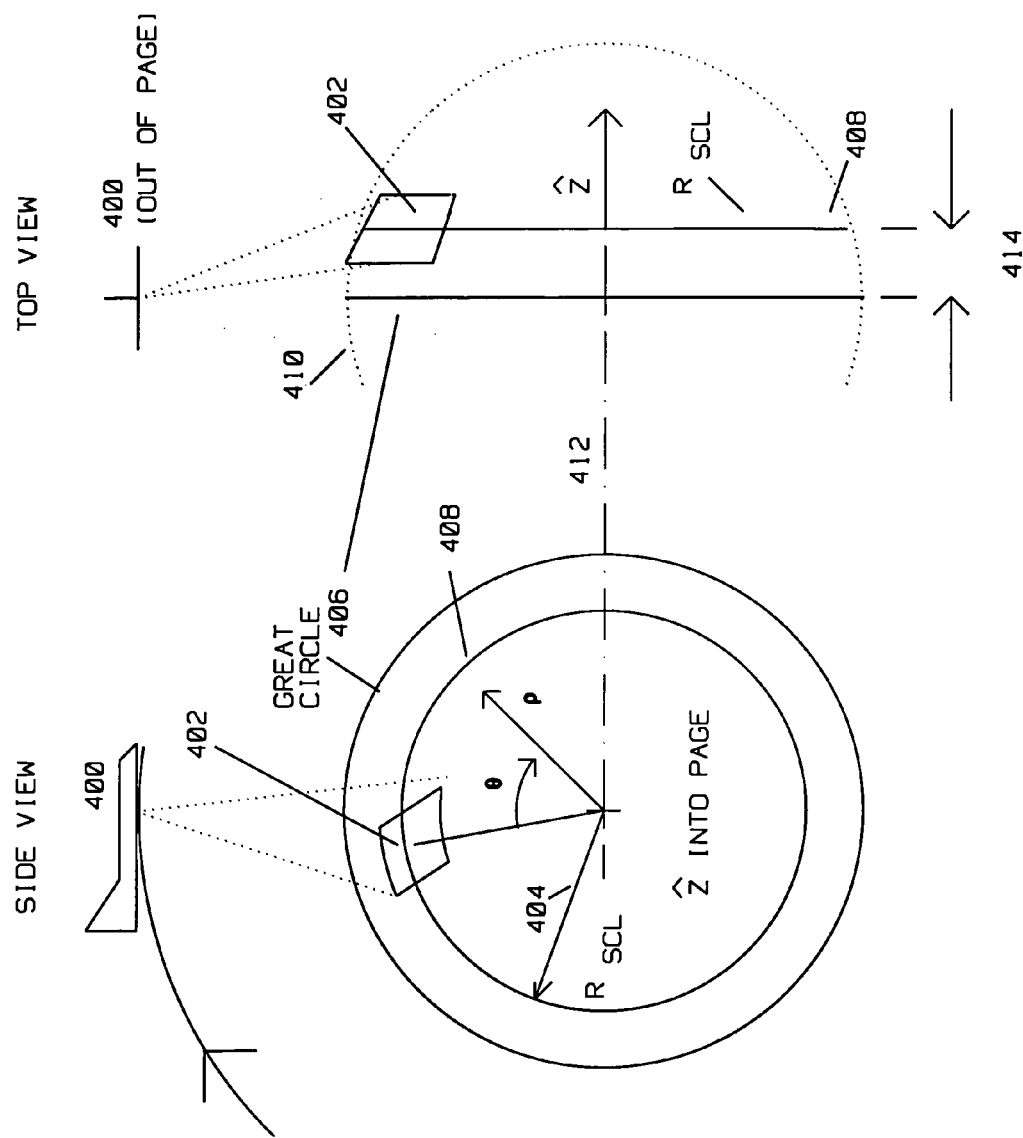
FIG. 4 shows the path of a moving platform (flying aircraft) following a great circle path for acquiring a SAR image, the phase deviation of the radar returns from a surface due to the curvature of the earth being corrected by the present invention for a clearer SAR image.

As shown in FIG. 4, SAR radar on moving platform (aircraft) 400 images a scene 402, where scene 402 is typically a small portion of the surface of the earth 410. As shown in FIG. 4, moving platform 400 follows a nominal path parallel along a great circle 406 of the earth 410. In the top view portion of FIG. 4, moving platform 400 is coming out of the page, thus scene 402 is to the left of the aircraft. Scene 402 is on a smaller circle, the local scene center line circle 408. Smaller local scene centerline circle 408 has the same axis 412 as that of great circle 406, however, the center of 408 is displaced by a distance 414 along the axis in the center of great circle 406. A great circle 406 is formed from the intersection of a great circle plane containing the earth's center point with the (nominal) ellipsoid describing the earth's surface. Because it is displaced with respect to great circle 406 along the axis of great circle 406, smaller local scene centerline circle 408 has by definition a smaller diameter than great circle 406, while parallel to great circle 406. Centerline circle 408 has a radius $R_{SCL}$.

Further shown in FIG. 4 is the $\hat{z}$ axis, pointing into the page for the side view, and along axis 412, towards the right in the top view. θ increases in the direction of moving platform 400 (aircraft) flight, and its origin is at the scene location. $\hat{z}$ is defined as $$\hat{z} = \rho \times \theta$$

Both the SAR swath mode and the spotlight mode are defined using a single point on the earth's surface. In swath SAR mode, this single point is the scene entry point. In SAR spotlight mode, this single point is the scene center point. In either case, the scene entry point or the scene center point can be projected onto the nominal earth surface. The projected point is the the scene nadir point. In accordance with Euclidian Geometry, there exists a unique plane, parallel to a great circle plane, which contains the scene nadir point. This unique plane is the scene center line plane. The scene nadir line is the intersection of this unique plane with the nominal earth ellipsoid surface. The distance between the scene entry point for swath SAR mode, or the scene center point for SAR spotlight mode and its nadir point is the scene altitude Z. The set of all points with nadir points on the scene center nadir line with altitude equal to the scene altitude is the scene center line.

The Scene Center Line

The scene center line is a set of points of fixed altitude Z above the center nadir line. The direction of the altitude is defined by the local normal vector to the nominal earth ellipsoid. In general, the local normal vector on the scene center nadir line does does not lie in the center scene center line plane. Consequently, the scene center line is a curve in three dimensions which does not lie in a single plane.

Because the scene is NOT flat, being part of a sphere, it is parametrized by $\eta$. Now, any point on the scene center line $x_{sc}$ can be found from:

$$x_{SC} = L_{SC}(\eta)$$

where $L_{SC}$ is a function of $R—R^3$, all of whose derivatives are continuous.

The Local Scene Center Line Circle 408

The scene center line can locally be approximated by a circle, such as Local Scene Center line circle 408. Circle 408 is defined by the local radius of curvature 404, $R_{SCL}(\eta)$, defined by $$K_{SC}(\eta) = \frac{\|L'_{SC}(\eta)\|^2 L''_{SC}(\eta) - L'_{SC}(\eta)(L'_{SC}(\eta) \cdot L''_{SC}(\eta))}{\|L'_{SC}(\eta)\|^4}$$

$$R_{SCL} = \frac{1}{\|K_{SC}(\eta)\|}$$

The center of circle 408 is, $$C_{SC}(\eta) = L_{SC}(\eta) + \frac{K_{SC}(\eta)}{\|K_{SC}(\eta)\|} R_{SCL}$$

Consequently, this circle can be parametrized by, $$L_{LSC,\eta}(\theta) = C_{SC}(\eta) + \frac{K_{SC}(\eta)}{\|K_{SC}(\eta)\|} R_{SCL}(\eta)\cos(\theta) + \frac{L'_{SC}(\eta)}{\|L'_{SC}(\eta)\|} R_{SCL}(\eta)\sin(\theta)$$

The Local Scene Cylinder

The local scene center line circle 408 can be used to define a cylindrical coordinate system, $\rho,\theta,z$, centered at the center of 408, given by the following directions, $$\hat{\rho} = \frac{K_{SC}(\eta)}{\|K_{SC}(\eta)\|}\cos(\theta) + \frac{L'_{SC}(\eta)}{\|L'_{SC}(\eta)\|}\sin(\theta)$$

and $$\hat{\theta} = -\frac{K_{SC}(\eta)}{\|K_{SC}(\eta)\|}\sin(\theta) + \frac{L'_{SC}(\eta)}{\|L'_{SC}(\eta)\|}\cos(\theta)$$

The third dimension is given by the cross product, $$\hat{z} = \hat{\rho} \times \hat{\theta}$$

In this coordinate system, the position of a target is, $$X_T = \rho_T \hat{\rho}(\theta_T) + z_T \hat{z}$$

and the nominal position of the moving platform (aircraft) is, $$X_{ac} = R_{nav}\hat{\rho}(\theta_{ac}) + Z_{ac}\hat{z}$$

This defines $R_{nav}$ which is the radius of motion of the moving platform (aircraft) 400 in the cylindrical coordinate system defined by the curvature of the scene center line.

This implies that the range to a target as a function of the moving platform (aircraft) position is, $$R_T(\theta_{ac}) = \sqrt{(\rho_T - R_{nav})^2 + (z_T - Z_{nav})^2 + 4\rho_T R_{nav}\sin^2\left(\frac{\theta_T - \theta_{ac}}{2}\right)}$$

In contrast to the typical RMA shown in FIG. 3, in the curved earth formulation of this invention shown on FIG. 4, the along track spatial frequency parameter is now $K_\theta = K_x/R_{scl}$, and the along track matched filter in accordance with this invention becomes:

$$F_{MF} = \exp\left(-i\left[R_{sc}\sqrt{K_R^2 - K_\theta^2/\alpha} - K_R R_s - \right.\right.$$

$$\left.\left. K_\theta(\Theta_{sc}) + \frac{\epsilon}{6}\frac{\sqrt{K_R^2 - K_\theta^2/\alpha}}{R_{sc}}\left(\Theta_{sc} + \frac{R_{sc}K_\theta/\alpha}{\sqrt{K_R^2 - K_\theta^2/\alpha}}\right)^3\right]\right)$$

where $$R_{sc}^2 = (R_{SCL} - R_{nav})^2 + (Z_{SCL} - Z_{ac})^2 +$$

$$4R_{SCL}R_{nav}\sin^2\left(\frac{\theta_o - \theta_c}{2}\right) - R_{NAV}R_{SCL}\sin(\theta_o - \theta_c)\tan(\theta_o - \theta_c)$$

$$\alpha = R_{NAV}R_{SCL}\cos(\theta_o - \theta_c)$$

$$\Theta = \tan(\theta_o - \theta_c)$$

$$\epsilon = R_{NAV}R_{SCL}\sin(\theta_o - \theta_c)$$

In the equations above, $\theta_o$ and $Z_{SCL}$ are defined to be the angular and axial coordinates of the scene entry point in local scene cylindrical coordinates, while $\theta_c$ is the angular coordinate of the center of the synthetic aperture of the scene entry point. Thus $\theta_o - \theta_c$ is the nominal angular offset between the moving platform (aircraft) position and the antenna pointing position in scene cylindrical coordinates. Thus, with above provision, this invention corrects radar returns for the case where the scene is not flat, being part of the earth's surface.

Thus, for the method described herein, it is assumed that the moving platform (aircraft) 400 path is:

a) a curved line part of a great circle at an altitude over the scene, assuming the scene is part of a spherical surface approximating the earth's surface;

b) a small deviation from a straight line flight path due to mild maneuvers and buffeting, these small deviations compensated for by an on-board inertial navigation system.

Figure 5:
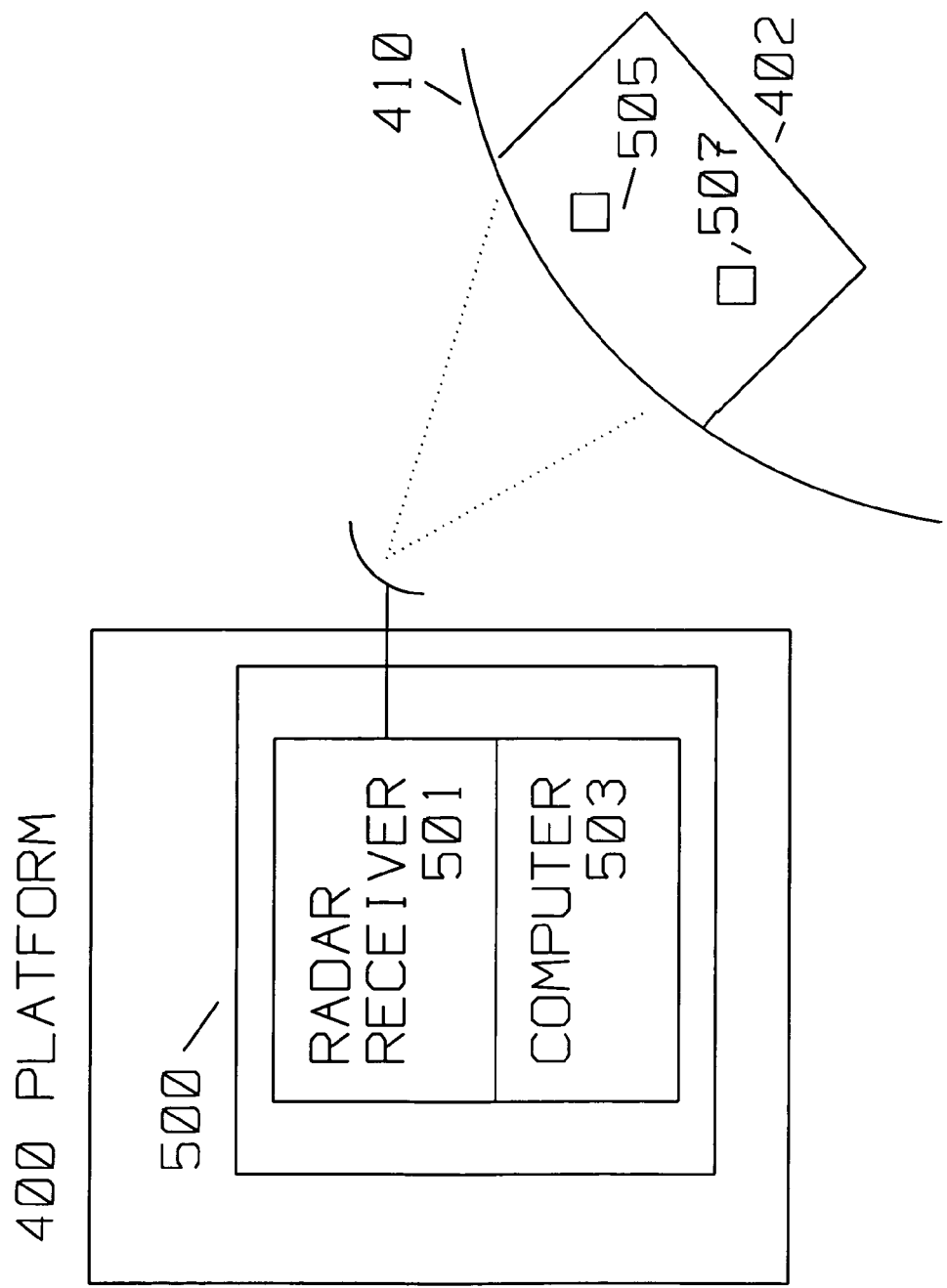
FIG. 5 shows the radar system of the present invention on a moving platform acquiring and processing data reflected from a surface.

Shown in FIG. 5 is a radar 500 for acquiring a synthetic aperture image of a scene (or surface) 402 on earth 410. As detailed in FIG. 4, said earth 410 has a great circle 406 centered with respect to said earth's center. Scene 402 has one or more radar scatterers such as 505 and 507. Radar 500 is mounted on a moving platform 400 moving with a component of motion in a direction along a great circle. Radar 500 comprises:

a) a radar receiver 501 for digitizing radar returns having a phase, the radar returns reflected from scatterers 505 and 507 on scene ( or surface) 402;

b) a computer 503 for focusing said phase of said radar returns from said scatterers 505 and 507 on said scene ( or surface) 402. Said scene ( or surface 402) is located on a local scene centerline circle 408 on earth 410, as further detailed in FIG. 4.

The phase of said radar returns received from said scene ( or surface) 402 are focused for the motion of said moving platform 400 using a cylindrical coordinate system referenced with respect to a second center detailed in FIG. 4. Computer 503 computes a synthetic aperture image from said phase adjusted returns reflected from scene ( or surface) 402.

All references cited in this document are incorporated herein in their entirety by reference.

Although presented in exemplary fashion employing specific embodiments, the disclosed structures are not intended to be so limited. For example, although the earth is referenced as a generally spherical surface (ellipsoid) where a moving platform follows a great circle path and the scene is located along side the great circle path, the geometric imaging/ranging principles are applicable to any planet or spherical body both big or small.

Those skilled in the art will also appreciate that numerous changes and modifications could be made to the embodiment described herein without departing in any way from the invention.

What is claimed is:

1. A radar for acquiring a synthetic aperture image of a scene on earth, said earth having a great circle centered with respect to said earth's center, said great circle having an axis perpendicular to a first plane, said axis passing through said earth's center, said first plane containing said great circle including said earth's center, said great circle having a first center defined by an intersection of said first plane and said axis, said scene having one or more radar scatterers on a surface, said radar system mounted on a moving platform moving with a component of motion in a direction along said great circle, said radar comprising:
   a radar receiver for digitizing radar returns having a phase from scatterers on said surface, and
   a computer for focusing said phase of said radar returns from said scatterers on said surface, said surface located on a local scene centerline circle, said local scene centerline circle defining a second plane, said second plane parallel to said first plane, said local scene centerline circle centered on said axis at a second center, said second center displaced with respect to said first center along said axis by a distance;
   said phase of said radar returns received from said scene focused for the motion of said moving platform along said great circle using a cylindrical coordinate system referenced with respect to said second center.

2. A radar system as described in claim 1 wherein said phase of said radar returns is focused by computing a nominal moving platform track in a cylindrical coordinate system defined by ρ, θ and Z centered with respect to said second center where
   ρ is an object distance from said second center within said cylindrical coordinate system,
   θ is an angle in a third plane, said third plane perpendicular to said first plane and said second plane, said third plane passing through said second center, θ=0 along said axis, and
   Z is a height above said second center;
   said ρ, and θ defining a scene center line approximated by a circle defined by a local radius of curvature, $R_{SCL}(\eta)$, said local radius of curvature defined by $$K_{SC}(\eta) = \frac{\|L'_{SC}(\eta)\|^2 L''_{SC}(\eta) - L'_{SC}(\eta)(L'_{SC}(\eta) \cdot L''_{SC}(\eta))}{\|L'_{SC}(\eta)\|^4}$$

and $$R_{SCL} = \frac{1}{\|K_{SC}(\eta)\|};$$

a center of said circle defined by $$C_{SC}(\eta) = L_{SC}(\eta) + \frac{K_{SC}(\eta)}{\|K_{SC}(\eta)\|} R_{SCL}$$

and parametrized by $$L_{LSC,\eta}(\theta) = C_{SC}(\eta) + \frac{K_{SC}(\eta)}{\|K_{SC}(\eta)\|} R_{SCL}(\eta)\cos(\theta) + \frac{L'_{SC}(\eta)}{\|L'_{SC}(\eta)\|} R_{SCL}(\eta)\sin(\theta),$$

$$\hat{\rho} = \frac{K_{SC}(\eta)}{\|K_{SC}(\eta)\|}\cos(\theta) + \frac{L'_{SC}(\eta)}{\|L'_{SC}(\eta)\|}\sin(\theta),$$

and $$\hat{\theta} = -\frac{K_{SC}(\eta)}{\|K_{SC}(\eta)\|}\sin(\theta) + \frac{L'_{SC}(\eta)}{\|L'_{SC}(\eta)\|}\cos(\theta);$$

said Z dimension given by a cross product, $$\hat{z} = \hat{\rho} \times \hat{\theta},$$

where a position of a target is $$x_T = \rho_T \hat{\rho}(\theta_T) + z_T \hat{z}$$

and where a nominal position of said moving platform is along a radius $R_{nav}$, said $R_{nav}$ the radius of motion of said moving platform in said cylindrical coordinate system defined by a curvature of said scene centerline, said position of target further defined by $$x_{ac} = R_{nav}\hat{\rho}(\theta_{ac}) + Z_{ac}\hat{z},$$

and range to said target from said moving platform is $$R_T(\theta_{ac}) = \sqrt{(\rho_T - R_{nav})^2 + (z_T - Z_{nav})^2 + 4\rho_T R_{nav}\sin^2\left(\frac{\theta_T - \theta_{ac}}{2}\right)}.$$

3. A radar system as described in claim 2, wherein said radar focuses said phase using:
   an along track spatial frequency parameter to compute said image from said radar returns, said along track spatial frequency parameter defined by $K_\theta = K_x/R_{SCL}$;
   an along track matched filter defined by $$F_{MF} = \exp\left(-i\left[R_{sc}\sqrt{K_R^2 - K_\theta^2/\alpha} - K_R R_s - \right.\right.$$

$$\left.\left. K_\theta(\Theta_{sc}) + \frac{\epsilon}{6}\frac{\sqrt{K_R^2 - K_\theta^2/\alpha}}{R_{sc}}\left(\Theta_{sc} + \frac{R_{sc}K_\theta/\alpha}{\sqrt{K_R^2 - K_\theta^2/\alpha}}\right)^3\right]\right)$$

where $$R_{sc}^2 = (R_{SCL} - R_{nav})^2 + (Z_{SCL} - Z_{ac})^2 +$$

$$4R_{SCL}R_{nav}\sin^2\left(\frac{\theta_o - \theta_c}{2}\right) - R_{NAV}R_{SCL}\sin(\theta_o - \theta_c)\tan(\theta_o - \theta_c),$$

$$\alpha = R_{NAV}R_{SCL}\cos(\theta_o - \theta_c),$$

$$\Theta = \tan(\theta_o - \theta_c),$$

-continued and $$\epsilon = R_{NAV} R_{SCL} \sin(\theta_o - \theta_c),$$

and where $\theta_o$ and $Z_{SCL}$ describe an angular and an axial coordinate of said scene entry point in said local scene cylindrical coordinates;

$\theta_c$ describes an angular coordinate of said center of said synthetic aperture imaging said scene entry point; and $\theta_o - \theta_c$ describes the nominal angular offset between said moving platform position and an antenna pointing position in said scene cylindrical coordinates.

4. A method for acquiring a synthetic aperture image of a scene on earth using a radar, said earth having a great circle centered with respect to said earth's center, said great circle having an axis perpendicular to a first plane, said axis passing through said earth's center, said first plane containing said great circle including said earth's center, said great circle having a first center defined by an intersection of said first plane and said axis, said scene having one or more radar scatterers on a surface, said radar system mounted on a moving platform moving with a component of motion in a direction along said great circle, said method comprising the steps of:
   digitizing radar returns having a phase from scatterers on said surface, and
   focusing said phase of said radar returns from said scatterers on said surface, said surface located on a local scene centerline circle, said local scene centerline circle defining a second plane, said second plane parallel to said first plane, said local scene centerline circle centered on said axis at a second center, said second center displaced with respect to said first center along said axis by a distance;
   forming an image from said radar returns received from said scene, said returns focused for the motion of said moving platform along said great circle using a cylindrical coordinate system referenced with respect to said second center.

5. A method as described in claim 4 wherein said phase of said radar returns is focused by computing a nominal moving platform track in a cylindrical coordinate system defined by $\rho$, $\theta$ and $Z$ centered with respect to said second center where
   $\rho$ is an object distance from said second center within said cylindrical coordinate system,
   $\theta$ is an angle in a third plane, said third plane perpendicular to said first plane and said second plane, said third plane passing through said second center, $\theta=0$ along said axis, and
   $Z$ is a height above said second center;
   said $\rho$, and $\theta$ defining a scene center line approximated by a circle defined by a local radius of curvature, $R_{SCL}(\eta)$, said local radius of curvature defined by $$K_{SC}(\eta) = \frac{\|L'_{SC}(\eta)\|^2 L''_{SC}(\eta) - L'_{SC}(\eta)(L'_{SC}(\eta) \cdot L''_{SC}(\eta))}{\|L'_{SC}(\eta)\|^4}$$

and $$R_{SCL} = \frac{1}{\|K_{SC}(\eta)\|}$$

a center of said circle defined by $$C_{SC}(\eta) = L_{SC}(\eta) + \frac{K_{SC}(\eta)}{\|K_{SC}(\eta)\|} R_{SCL}$$

and parametrized by $$L_{LSC,\eta}(\theta) = C_{SC}(\eta) + \frac{K_{SC}(\eta)}{\|K_{SC}(\eta)\|} R_{SCL}(\eta)\cos(\theta) + \frac{L'_{SC}(\eta)}{\|L'_{SC}(\eta)\|} R_{SCL}(\eta)\sin(\theta),$$

$$\hat{\rho} = \frac{K_{SC}(\eta)}{\|K_{SC}(\eta)\|}\cos(\theta) + \frac{L'_{SC}(\eta)}{\|L'_{SC}(\eta)\|}\sin(\theta),$$

and $$\hat{\theta} = -\frac{K_{SC}(\eta)}{\|K_{SC}(\eta)\|}\sin(\theta) + \frac{L'_{SC}(\eta)}{\|L'_{SC}(\eta)\|}\cos(\theta);$$

said $Z$ dimension given by a cross product, $$\hat{t}\hat{a}\hat{t}\hat{z}\hat{m}\hat{e}\hat{d} = \rho \times \theta$$

where a position of a target is $$X_T = \rho T \rho(\theta_T) + z_T \hat{z}$$

and where a nominal position of said moving platform is along a radius $R_{nav}$, said $R_{nav}$ the radius of motion of said moving platform in said cylindrical coordinate system defined by a curvature of said scene centerline, said position of target further defined by $$x_{ac} = R_{nav}\hat{\rho}(\theta_{ac}) + Z_{ac}\hat{z},$$

and range to said target from said moving platform is $$R_T(\theta_{ac}) = \sqrt{(\rho_T - R_{nav})^2 + (z_T - Z_{nav})^2 + 4\rho_T R_{nav}\sin^2\left(\frac{\theta_T - \theta_{ac}}{2}\right)}.$$

6. A radar system as described in claim 5, wherein said phase is focused using:
   an along track spatial frequency parameter for computing said image from said radar returns, said along track spatial frequency parameter defined by $K_\theta = K_z/R_{SCL}$;
   an along track matched filter defined by $$F_{MF} = \exp\left(-i\left[R_{sc}\sqrt{K_R^2 - K_\theta^2/\alpha} - K_R R_s - K_\theta(\Theta_{sc}) + \frac{\epsilon}{6}\frac{\sqrt{K_R^2 - K_\theta^2/\alpha}}{R_{sc}}\left(\Theta_{sc} + \frac{R_{sc} K_\theta/\alpha}{\sqrt{K_R^2 - K_\theta^2/\alpha}}\right)^3\right]\right)$$

where $$R_{sc}^2 = (R_{SCL} - R_{nav})^2 + (Z_{SCL} - Z_{ac})^2 +$$
$$4R_{SCL} R_{nav}\sin^2\left(\frac{\theta_o - \theta_c}{2}\right) - R_{NAV} R_{SCL}\sin(\theta_o - \theta_c)\tan(\theta_o - \theta_c),$$

$$\alpha = R_{NAV} R_{SCL}\cos(\theta_o - \theta_c),$$

$$\Theta = \tan(\theta_o - \theta_c),$$

and $$\epsilon = R_{NAV} R_{SCL}\sin(\theta_o - \theta_c),$$

and where $\theta_o$ and $Z_{SCL}$ describe an angular and an axial coordinate of said scene entry point in said local scene cylindrical coordinates;

$\theta_c$ describes an angular coordinate of said center of said synthetic aperture imaging said scene entry point; and $\theta_o-\theta_c$ describes the nominal angular offset between said moving platform position and an antenna pointing position in said scene cylindrical coordinates.

* * * * *